Figures 1, 2:
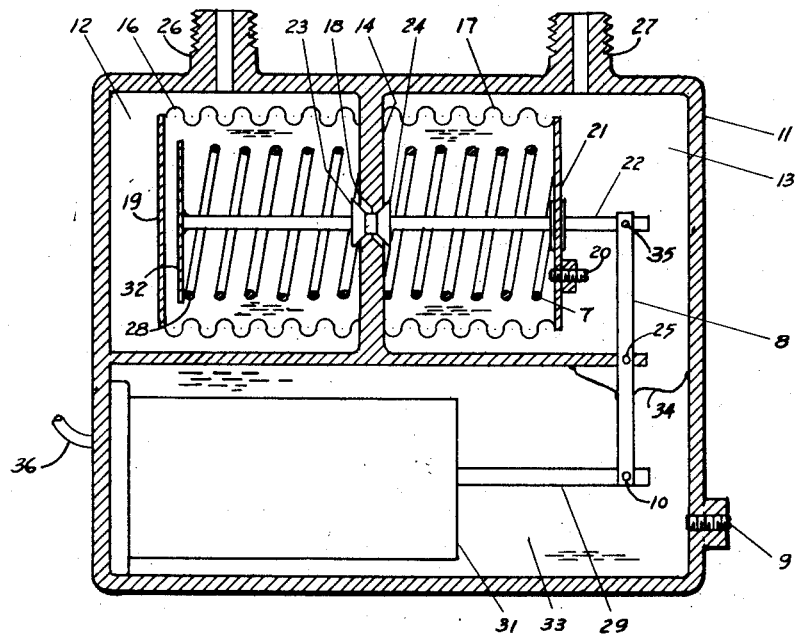

Nov. 17, 1953 R. K. MacLEA, JR., ET AL 2,659,390
PRESSURE RESPONSIVE DEVICE
Filed June 17, 1948 2 Sheets-Sheet 1

ROBERT K. MacLEA Jr.
IVAN A. GREENWOOD Jr.
HERBERT ZIEBOLZ
INVENTORS

BY H.J. Mackey
ATTORNEY

Nov. 17, 1953 R. K. MacLEA, JR., ET AL 2,659,390
PRESSURE RESPONSIVE DEVICE
Filed June 17, 1948 2 Sheets-Sheet 2

ROBERT K. MacLEA Jr.
IVAN A. GREENWOOD Jr.
HERBERT ZIEBOLZ
INVENTORS

BY [signature]
ATTORNEY

Patented Nov. 17, 1953

2,659,390

UNITED STATES PATENT OFFICE 2,659,390

PRESSURE RESPONSIVE DEVICE

Robert K. MacLea, Jr., Greenwich, Conn., Ivan A. Greenwood, Jr., Pleasantville, N. Y., and Herbert Ziebolz, Chicago, Ill., assignors to General Precision Laboratory Incorporated, a corporation of New York Application June 17, 1948, Serial No. 33,504

1 Claim. (Cl. 137—785)

The present invention relates to a differential pressure translating device for use in measuring or controlling pressure differentials.

When metering flowing fluids by means of a primary device such as an orifice, Venturi tube or Pitot tube, an instrument sensitive to the difference of two fluid pressures is required, capable of actuating a dial recorder or servo equipment to indicate, record, or control the fluid flow. Such an instrument is also adapted to indicate, record, or control liquid level and in general for operation on any two fluid pressures however derived, whether of two like or unlike fluids.

Such an instrument has a pressure-sensitive element, commonly a diaphragm or bellows or combination thereof, together with restoring elements to oppose the differential fluid force, with the motion of the diaphragm or bellows combination transmitted mechanically or electromechanically to an indicating device such as a needle moving over a dial, or to recording or controlling equipment.

An object of the invention is to provide a device containing a protective, substantially incompressible liquid, which device is responsive to the differential between two pressures, such as for example, the differential between the pressures upstream and downstream with respect to an orifice, nozzle or Venturi tube, the device being so constructed that if either pressure acts on the device alone without the other pressure acting in opposition thereto, the device will be adequately protected against destruction or permanent distortion, and will resist abusive conditions which would prevent an accurate reading being obtained when normal operating conditions should be resumed, but a device which nevertheless is highly sensitive to differentials in pressure even of very small magnitude. That is, in this device sensitivity is not sacrificed in order to insure against destruction or permanent distortion under conditions of abuse.

In one preferred embodiment of the invention two bellows are fastened on opposite sides of a partition in a pressure chamber. The free end of one of the bellows has a rod connected thereto which passes through the partition and carries discs which may serve as mechanical limits to bellows movement. The interiors of the bellows are filled with a stable non-corrosive liquid and the limit discs, when either is in contact with the partition, also act as stop valves, sealing the opening connecting the interiors of the bellows, trapping liquid within the bellows and preventing damage to the one under higher pressure in case of excessive pressure. Restoring springs are provided internally between the bellows and the partition wall. The bellows motion is communicated through a lever to an electrical transmitter in a second chamber, and the passage between the two chambers is sealed by a flexible diaphragm. The compartment containing the electrical transmitter is filled completely full of a substantially incompressible liquid. This will resist pressure communicated through the diaphragm from the pressure chamber, thus preventing damage to the diaphragm by excessive pressure, yet not impeding the movement of the lever and diaphragm, and permitting thermal expansion of the liquid.

The electrical transmitter is preferably a transformer having an alternating current primary and two secondaries, one at each end, with an armature of a material having a relatively large magnetic permeability. The difference of the output voltages can then be made directly dependent on the position of the armature and this output difference therefore becomes a signal which may indicate in a directly proportional manner the numerical difference in the fluid pressures within the two parts of the pressure chamber. Of course those skilled in the art will appreciate that in place of the described electrical transmitter any other type of signal generator may be used. The signals may be interpreted by various means and may be utilized either to indicate the quantity being measured or through well-known control means such as amplifiers, servos and motors to maintain the measured quantity at a desired value. Interpretation and utilization of these signals, however, form no part of the present invention.

Although the measurement of differential pressure is used as an illustration, it is obvious that a single pressure alone can be measured as well.

In another preferred embodiment the construction preserves the advantages of that just described, but utilizes the space within the bellows themselves for the electrical generator, thus eliminating the second chamber in the form previously described. The greater compactness thus achieved retains the safety feature of isolation of the electrical generator from possible corrosive effects of the fluid under measurement, and retains the hydraulic stop valves, preventing damage to the bellows by excessive unbalanced pressure. This construction has the further advantage of eliminating lever linkage between the sensitive element and the electrical generator, since the rod connected to one of the bellows heads internally can now itself carry the armature of the generator.

The exact nature of the invention will be more clearly understood from the following detailed description when taken together with the accompanying drawings, in which:

Figure 1 shows one form of the invention utilizing two differential fluid pressure measuring bellows and an electrical signal generator connected by a lever.

Figure 3:
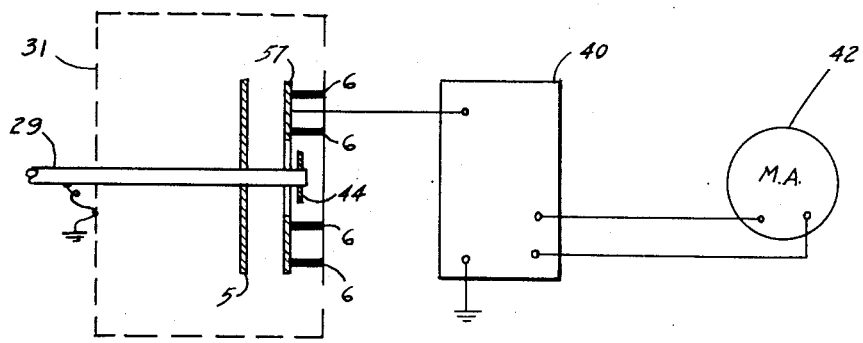
Figure 4:
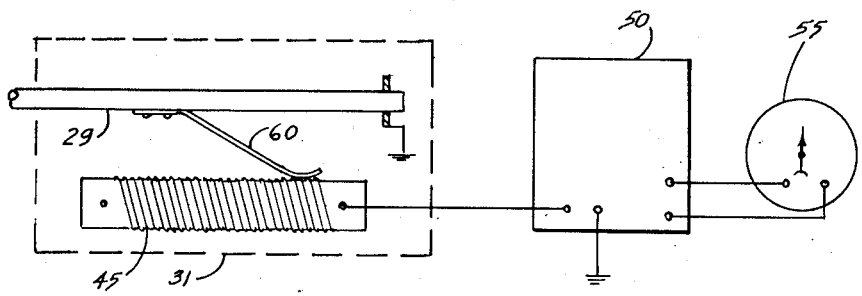

Figures 2-4 inclusive, illustrate different forms of electrical signal generator which may be utilized in the arrangements of the other figures.

Figure 5:
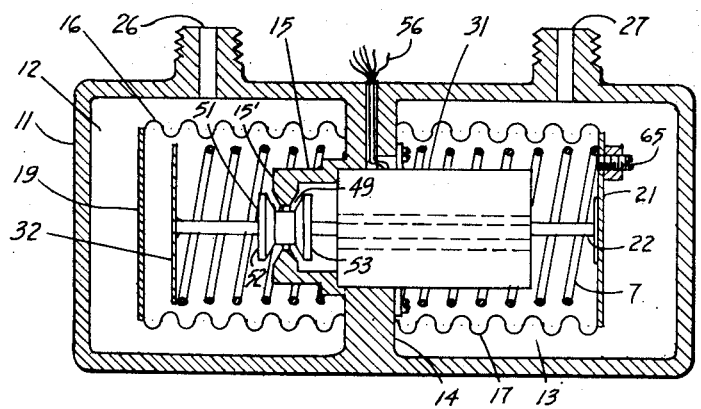

Figure 5 shows a more compact construction than that of Fig. 1, with the electrical signal generator inside the differential fluid pressure measuring bellows.

Referring to Figure 1, a pressure vessel 11 is divided internally into two chambers 12 and 13 by a rigid partition 14, a bellows 16 being located in the chamber 12 and bellows 17 in chamber 13. Each bellows is made of metal a few thousandths of an inch thick with corrugated walls and fastened as by soldering to partition 14 so as to form a liquid-tight joint. Each bellows also has at its end away from the partition a head, 19 and 21, fastened in a liquid-tight manner to the corrugated body as by soldering. The rigid partition 14 contains an aperture 18 located within the interior bellows space and providing communication between the interiors of the two bellows. A rod or tube 22 is firmly fastened to bellows head 21 and extends into the interior of the bellows 16. This rod carries valve discs 23 and 24 at locations on each side of the central partition. They have a dual function. They serve as mechanical stops to limit the travel of the bellows assembly, and they serve as hydraulic valves seating against the partition 14, the edges of aperture 18 being appropriately shaped to serve as liquid-tight valve seats. The interior of the bellows assembly is filled with an incompressible, non-corrosive highly fluid liquid, such as transformer oil. In applications where the device is required to endure relatively high temperatures, a special liquid may be employed such as a silicone, a specially treated petroleum product, or the like. Filler plug 20 is for filling the interiors of the bellows with the liquid. The functions of the liquid are to prevent collapse or overstrain of the bellows by external fluid pressure and to compel the two bellows to move as a single assembly.

The bellows assembly and the rod 22 are centered at zero position by a pair of compression springs 7 and 28 which also act to present a force opposing the differential force which is proportional to displacement. The spring 7 has one end abutting against the wall of the partition 14 and the other against the head 21 of the bellows 17 so that the bellows assembly is urged toward the right by the direct pressure of this spring exerted on the head 21, the bellows 16 being constrained to follow any movement of the bellows 17 by reason of the incompressible liquid filling of the bellows assembly.

The spring 28 while having one end abutting against the wall of the partition 14 is wholly free of engagement with the bellows 16 for reasons as will appear more fully hereinafter. Instead of engaging the bellows 16 the end of the spring 28 remote from the partition 14 engages an enlarged end portion 32 affixed to the rod 22. The force exerted by spring 28, therefore, which tends to urge the bellows assembly toward the left acts through the rod 22 against the bellows 17 and the bellows 16 is constrained to move with the bellows 17 by reason of the incompressible fluid filling of the bellows assembly.

An extension of rod 22 or a separate similar rod outside of and beyond one of the bellows heads 21 is pivoted by a pin 35 to a lever 8, which has a fixed fulcrum 25 on the frame or chamber wall. The other end of the lever is pivoted by a pin 10 to electric signal generator actuating rod 29, which actuates electric signal generator 31 within signal generator chamber 33. The latter is completely oil-tight and filled with oil through filler plug 9. The aperture where lever 8 passes from chamber 13 to chamber 33 is made oil-tight by a diaphragm 34, arranged to move with movement of lever 8. Electric signal generator leads 36 are brought through the wall of chamber 33 by means of a simple pressure-tight insulating fitting. Since these leads, carrying the electrical signal representing the differential pressure, are stationary, this construction is conventional and is easily made permanently leakproof against any desired operating pressure.

The electric signal generator 31 may be any one of several types. Figure 2 illustrates one type with a possible indicating circuit shown schematically as an aid to understanding its operation. The electric signal generator actuating rod 29 carries a powdered iron armature 32 movable axially within sliding bearing 43 inside a solenoid carrying a primary winding 37 and two secondary windings 38 and 39. The secondary windings are spaced axially with respect to each other and the primary 37 occupies the space between these windings. The armature 32 has a length in excess of the length of the primary 37 so that in its medial position the armature 32 extends some distance into the cores of secondary windings 38 and 39. The primary 37 is continuously energized by alternating current of, for example, 60-cycle frequency, as diagrammatically illustrated by the terminals 30, and voltages induced in the secondaries are functions of the armature position, the difference in these voltages constituting a substantially proportional indication of the position of the armature 32. The voltages may be amplified and subtracted by a differential amplifier 41 and the difference used to actuate a milliammeter 42, connected to the output of the amplifier 41 and which can be calibrated to read directly in terms of the flow rate, pressure, or differential pressure being measured.

The same result can be accomplished using variation of capacitance instead of electromagnetic induction. Figure 3 illustrates one manner in which this might be accomplished. As described in connection with Figs. 1 and 2 the electric signal generator 31 is actuated by rod 29. The latter is movable axially in sliding bearing 44 and carries a disc 5. Ring 57 carried by the frame forms with disc 5 two plates of a condenser. The disc 5 may be grounded on rod 29 while the ring 57 is insulated by insulators 6. The electrostatic capacity of this condenser varies with the distance between the disc and ring, and is measured by capacity bridge 40 and indicating meter 42.

The reading of the latter is dependent on the capacity of the condenser, which in turn is dependent on the position of rod 29 and on the quantity under measurement, so that the meter may be calibrated in terms of differential pressure or other quantity being measured.

The same result can also be accomplished as shown in Fig. 4, using a variation of the electrical signal generator 31 which is actuated by rod 29 moving axially as before but wherein the latter operates a movable contact 60 on a variable resistor 45. The resistance included between one end of the resistor and the movable contact is measured by any resistance-sensitive device such as a Wheatstone bridge 50, whose galvanometer 55 may be calibrated if desired in terms of the quantity under measurement.

As an aid in understanding the operation of this invention let it be supposed that the difference between the pressures in two steam lines is to be measured with accuracy, each carrying a maximum of 650 pounds per square inch pressure, and that momentarily one carries a pressure of 650 pounds per square inch and is connected through nipple 27, Fig. 1, to chamber 13 for measurement, and that the other carries a pressure of 649 pounds per square inch, and is connected through nipple 26 to chamber 12 for measurement. The bellows assembly and rod 22 will then move toward the left through the action of the incompressible fluid contained therein until the added force of compression of spring 7 balanced against the reduced force of compression of spring 28 just counter-balances the one pound excess of pressure in chamber 13 over that in chamber 12, at which point movement stops. This movement, communicated through lever 3, causes signal rod 29 to be displaced. Let it be supposed that the electromagnetic system of Fig. 2 be used; then the rod 29 displaces the armature 32 from its neutral position and increases the reactance of one secondary coil while at the same time decreasing the reactance of the other. The input of the amplifier 41 is thereby unbalanced in one direction or the other and this unbalance is translated into an appropriate reading on the milliammeter 42 connected in the amplifier output. The pressure of 650 pounds per square inch in chamber 13, although producing that pressure within the lightly-constructed diaphragm 34, does not rupture or otherwise deform it because the chamber 33 on the other side of the diaphragm is filled with a substantially incompressible liquid of any suitable type which supports the diaphragm and develops a resistive pressure of 650 pounds per square inch exactly equal to that in chamber 13, preventing any substantial strain on the diaphragm.

In the event that an overload is placed on the device either by a relatively great decrease in the pressure in one chamber with respect to the other or conversely an undue increase in one as respects the other, the increased difference in pressure acting on the bellows 16 and 17 might become so great as to injure or destroy the mechanism. The hydraulic valves and stops 23 and 24 and the fluid filling of the interior of the bellows assembly, however, prevent injury in case of such overload and permit the use of a delicate sensitive measuring device, while at the same time providing an apparatus which is rugged and capable of standing harsh treatment.

Suppose for example, due to carelessness, improper operation, or some other reason the pressure in chamber 12 were suddenly decreased to zero while the pressure in chamber 13 remained at 650 pounds per square inch. The difference in pressure which would act on the bellows assembly would then be 650 pounds per square inch, which would be sufficient to destroy even the most rugged device of this nature, let alone one delicate enough to measure a differential pressure of a pound or less. When, however, this untoward event occurs in the device of this invention this great difference in pressure will cause the bellows 16 and 17 to move to the left to such an extent that the valve 24 seats on the valve seat 18, preventing further motion of the assembly and also sealing the orifice 18 preventing any further flow of fluid from the interior of the bellows 17 into the interior of the bellows 16. Further movement of the bellows 17 is then rendered impossible because the engagement of the valve stop 24 by the partition 14 seals the orifice 18 and the incompressible fluid completely filling the interior of bellows 17 is trapped therein supplying a pressure force which is equal in all directions and counteracts the external pressure imposed by the pressure of the fluid in chamber 13. The walls of the bellows 17 are, therefore, supported by this trapped fluid and they cannot be collapsed, distorted or otherwise deformed by the undue difference in pressure.

If the overload occurs in the opposite direction either because of an undue drop in pressure in the chamber 13 or an undue relative increase in pressure in chamber 12, it will be readily apparent that a similar action takes place but in the opposite direction. In such an instance the incompressible fluid will act as the motive force which moves the entire bellows assembly and hence rod 22 to the right until the valve stop 23 engages the partition 14. When this engagement occurs further liquid flow between the interiors of bellows 16 and 17 is prevented by the sealing of the orifice and the trapped fluid remaining in the interior of the bellows 16 acts as a support therefor, preventing its deformation or destruction, since regardless of the absolute pressures in chambers 12 and 13 the incompressible liquid completely filling the bellows 16 and 17 acts as a counterforce which supports the walls of these delicate elements at all times.

The construction shown in Fig. 1 provides for automatic compensation for variations in temperature of the liquid filling the bellows, whether caused by changes in ambient temperature or by changes in the temperatures of either or both actuating fluids surrounding the bellows. Accuracy of the device will thus be unaffected by temperature changes. The position of actuating rod 22 is controlled by calibrated compression spring 7 in opposition to calibrated compression spring 28. This rod is connected to head 21 while head 19 is free of metallic connection to the rod. Thermal expansion or contraction of the liquid within the bellows will therefore move bellows head 19 and not bellows head 21, since the spring constant of the material of bellows 16 is made small compared with the spring constant of spring 7 or 28 plus bellows 17. However, no matter what the temperature and the resulting position of bellows head 19, the interior space being completely filled with incompressible liquid any excess of actuating pressure on head 19 over that on head 21 will be perfectly communicated by hydraulic transmission through the internal filling liquid from head 19 to head 21, thereby moving head 19 and of necessity also head 21, and with the latter actuating rod 22, resulting in motion of rod 29 and production of a signal by generator 31, and the amount of this signal will thus be independent of any temperature variations.

In Fig. 5 another and somewhat more compact embodiment of the invention is disclosed wherein the signal generator is enclosed within the differential bellows assembly itself.

As in the case of the form of the invention disclosed in Fig. 1 two bellows 16 and 17 extend on opposite sides of a partition 14 which separates a pressure vessel 11 into two chambers 12 and 13.

Internal springs 7 and 28 serve to center the assembly in its neutral position, the spring 7 engaging the partition 14 and bellows head 21, and the spring 28 applying its force between the partition 14 and the plate 32 affixed to the rod 22. A nipple 26 serves as the communicating port of the portion 12 for application of pressure to this part of the chamber, and a nipple 27 serves the same purpose for the portion 13 of the pressure chamber 11. The partition 14 is provided with an extension 15 extending toward one end of the chamber 11 and completely within the bellows 16 and this extension is provided with a wall 15' which is closed except for an orifice 49 serving as valve seat. The rod 22 rigidly fastened at one end to the head 21 of the bellows 17 is provided intermediate its length with an enlarged portion 51 which extends slightly beyond the wall 15'. The enlarged portion 51 is provided with valve discs 52 and 53 located on either side of the orifice 49 in the end wall 15' of the extension 15 on the partition 14 so that undue movement of the bellows assembly in either direction is prevented by the closing of the communicating orifice 49 between the bellows 16 and 17.

A liquid completely fills the bellows assembly and may be introduced through a filling plug such as 65. It also completely permeates the space occupied by the signal generator and this liquid may be of any suitable incompressible, highly fluid, non-corrosive, non-gumming composition. Its function is to connect the two bellows heads 19 and 21 with each other hydraulically and also to protect the bellows assembly from injury when undue differential pressures are applied thereto. This liquid also acts as a lubricant and protection for the moving parts of the signal generator.

An electrical signal generator 31, which may be one of the types disclosed in Figs. 2, 3 or 4 or any other suitable mechanism is rigidly fastened to the partition and wholly contained within the compartment formed by the bellows 17 and extension 15 of the partition 14, the extension 15 providing the increased volumetric capacity necessary for the inclusion of the signal generator within the bellows assembly.

The rod 22 constitutes the actuating element of the signal generator and may carry a magnetic core when a signal generator of the form disclosed in Fig. 2 is used; may carry a movable condenser element when a signal generator of the form disclosed in Fig. 3 is used; or may carry a movable contact when a signal generator of the form described in Fig. 4 is used.

By this arrangement no great difficulties in sealing the unit are encountered since the bellows assembly and signal generator are contained in one compact sealed unit and no mechanical movement need be communicated from this assembly to any mechanism located outside of this sealed unit. Indeed the only communication from this unit to any outside element is by way of the electrical connecting leads 55 which since they are non-moving elements may be passed through a small drilled passage in the partition 14 and the passage sealed in any desired manner, non-moving parts being much more easily and efficiently sealed against high pressures than moving parts which require stuffing glands and the like.

The operation of the device of Fig. 5 is similar in mode and principle to that described in connection with Fig. 1 and no extended description is necessary. Suffice it to say that, a difference in pressures in portions 12 and 13 of the chamber 11 introduced through nipples 26 and 27 will cause the bellows assembly to move in one direction or the other, resulting in a movement of the rod 22 in one or the other direction and thus altering the output of the signal generator 31, which change in output may be indicated on a suitable meter or used to actuate any desired control or the like. Likewise when an overload is placed on the assembly one or the other of valve discs 52 or 53 will seat and seal the orifice 49 from a flow of liquid between the bellows compartments, trapping the incompressible liquid in the bellows compartment so that the bellows element is supported throughout its surface by an equal and opposite pressure preventing the destruction or injury thereof.

A construction is employed for inherent automatic temperature compensation similar to that described in connection with Fig. 1. The position of the generator and rod 22 is controlled at any specific differential pressure by springs 7 and 28 acting through rod 22 on head 21, while head 19 is free to expand or contract in obedience to the thermal expansion or contraction of the liquid completely filling the interiors of the bellows, without communication of the thermal motion to head 21. However, any differential pressure exerted on head 19 by the surrounding actuating fluid in chamber 12 will result in motion which will be hydraulically communicated to head 21 and thence by mechanical connection to generator 31.

What is claimed is:

A differential pressure device of the type described comprising, means for providing two enclosing chambers separated from each other by a partition, an axially expansible chamber member in each of said two enclosing chambers, said expansible chamber members being axially aligned and having their adjacent ends anchored and sealed to said partition with their opposite ends free to move under the influence of pressure in said enclosing chambers, said expansible chamber members being in communication with each other through an orifice in said partition and being filled with a non-compressible fluid, and valve means adapted to seat on valve seats on the opposite sides of said partition to close said aperture when the differential pressure to which said bellows are subjected exceeds a predetermined amount, resilient means biasing said valve means to a normal position, and means operatively connected only and directly to one of said expansible chamber members for moving said valve means, with said other expansible chamber member being free to move independently of the first expansible chamber members in response to expansion and contraction of said non-compressible fluid, and utilization means responsive to movement of said valve means in accordance with the differential of said pressures.

ROBERT K. MacLEA, Jr.
   IVAN A. GREENWOOD, Jr.
   HERBERT ZIEBOLZ.

References Cited in the file of this patent

UNITED STATES PATENTS

| Number | Name | Date |
|---|---|---|
| 1,239,565 | Collinson | Sept. 11, 1917 |
| 2,058,858 | Fetyko | Oct. 27, 1936 |
| 2,105,127 | Petroe | Jan. 11, 1938 |
| 2,276,580 | Hofer | Mar. 17, 1942 |
| 2,361,788 | Neff | Oct. 31, 1944 |
| 2,400,048 | Jones | May 7, 1946 |
| 2,590,324 | Jones | Mar. 25, 1952 |
| 2,593,473 | McKnight, Jr. | Apr. 22, 1952 |

FOREIGN PATENTS

| Number | Country | Date |
|---|---|---|
| 133,056 | Great Britain | Dec. 16, 1920 |
| 389,157 | Germany | Feb. 1, 1924 |
| 264,873 | Great Britain | June 23, 1927 |